April 17, 1945.  J. F. PRICE ET AL  2,373,708
APPLICATION OF CLOSURES TO CONTAINERS
Filed Feb. 20, 1940    6 Sheets-Sheet 1

INVENTORS:
John F. Price
& Isaac L. Wilcox,
BY Bodell & Thompson
ATTORNEYS.

April 17, 1945.   J. F. PRICE ET AL   2,373,708
APPLICATION OF CLOSURES TO CONTAINERS
Filed Feb. 20, 1940   6 Sheets-Sheet 3

FIG_3_

INVENTORS:
John F. Price
& Isaac L. Wilcox,
BY Bodell & Thompson
ATTORNEYS.

April 17, 1945.   J. F. PRICE ET AL   2,373,708
APPLICATION OF CLOSURES TO CONTAINERS
Filed Feb. 20, 1940   6 Sheets-Sheet 4

FIG. 4.

INVENTORS:
John F. Price
 & Isaac L. Wilcox,
BY
ATTORNEYS

April 17, 1945.    J. F. PRICE ET AL    2,373,708
APPLICATION OF CLOSURES TO CONTAINERS
Filed Feb. 20, 1940    6 Sheets-Sheet 5

INVENTORS:
John F. Price
& Isaac L. Wilcox,
BY
ATTORNEYS.

Patented Apr. 17, 1945

2,373,708

UNITED STATES PATENT OFFICE 2,373,708

APPLICATION OF CLOSURES TO CONTAINERS

John F. Price and Isaac L. Wilcox, Fulton, N. Y., assignors to Oswego Falls Corporation, Fulton, N. Y., a corporation of New York Application February 20, 1940, Serial No. 319,918

12 Claims. (Cl. 226—83)

This invention relates to a machine for applying closures to containers, which closures are coated with a substance rendered adhesive by the application of heat. The specific embodiment of the machine herein referred to is intended for the application of closures in the nature of hood caps to containers in the form of milk bottles.

The invention has as an object a closure applying machine embodying a particularly efficient structure which is operable to apply closures on containers with great rapidity, and which closures may be coated with any form of substance rendered self-securing by the application of heat.

The invention consists in the novel features and in the combinations and constructions hereinafter set forth and claimed.

In describing this invention, reference is had to the accompanying drawings in which like characters designate corresponding parts in all the views.

The machine herein described is in general form and construction similar to the machine disclosed in Patent No. 2,177,990 to L. J. Madden, October 31, 1939, and in numerous instances reference will be made to said patent for a more specific description of various structures of the machine.

This machine consists of a base 20 in which is mounted a driving motor 21 operatively connected by a belt 22 to a transmission arranged in housing 23. The machine is provided with means in the nature of a turret 24 for supporting and advancing a plurality of bottles. The turret 24 is journalled on a column 25 arranged centrally of the base, the turret being supported by anti-friction bearing 26 and being rotated by a sprocket 27 which is operatively connected to the transmission in housing 23 by a chain drive, as more particularly described in the Madden patent referred to.

A bottle conveyor 28 is arranged in juxtaposition to the forward side of the machine, and the bottles are fed from the conveyor 28 onto the turret 24 by an in-feed star wheel 29, and the containers or bottles to which closures have been applied and secured are transferred from the turret 24 to the conveyor 28 by an out-feed star wheel 30. The bottles are guided during movement by the star wheels by a guide member 31. The star wheels 29, 30 are rotated in synchronism with the turret 24 as is conventional in machines of this type.

As the uncapped bottles are fed onto the turret by the star wheel 29, a closure or cap is deposited on the top of each bottle. The closures herein referred to are in the form of paper disks having a central discoidal portion 35 which approximately fits the tops of the bottles, and a flaring skirt portion 36. At least the skirt portion is coated or impregnated with a substance which is rendered moldable and adhesive by the application of heat to the cap. The caps are heated or brought to proper temperature after they have been deposited on the tops of the bottles and thereafter, the skirt portions are folded about the top of the bottles and are maintained in contracted position by the adhesive or binder. The caps are arranged in stack formation in a magazine 37 with the discoidal portion 35 extending downwardly, and the magazine being arranged to support the stack of caps in this position and being open at the lower end to permit successive removal of the caps by a cap transfer member 38.

The cap transfer member is provided with a suction cup 39 and the member is oscillated about a pivot point 40 to move the suction cup upwardly into engagement with the lowermost cap in the stack formation, withdraw the cap from the magazine 37 and subsequently release the cap, whereupon it drops upon a plurality of screw conveyors 41 extending lengthwise through a housing 43 arranged on the top section 44 of the machine. The arrangement is such that the screw conveyors 41 support a plurality of caps. That is, a plurality of caps are maintained in the housing 43 and as the screw conveyors 41 are revolved, the caps are progressed toward the forward side of the machine and successively discharged into a passage 46 which terminates adjacent to the tops of the containers as they are being fed onto the turret 24 by the star wheel 29.

The upper section 44 of the machine is carried by a post 50 extending upwardly from the base 20 within the column 25. The lower end of the post 50 is threaded into a nut 51 which is provided with a gear 52. The gear 52 meshes with a pinion mounted on a shaft journalled in the base 20 and which is manually operable by a crank arranged on the exterior of the base. Upon rotation of the nut 51, the post 50 is adjusted vertically and accordingly, the structure carried by the post may be moved toward and from the turret 24. The pinion, shaft, and manual are not shown. However, this construction for vertically adjusting the super-structure of the machine to accommodate bottles of different heights is commonly employed and well understood by those familiar with machines of this type.

After the closures have been deposited upon the tops of the bottles, they are heated by an oven arrangement positioned above the tops of the bottles and extending from a point adjacent the in-feed star wheel 29 toward the rear of the machine. This oven is of arcuate formation consisting of an inner member 55, substantially U-shaped in cross section, and an outer member 56. A layer of insulating material 57 is arranged between the inner and outer walls 55, 56.

Heating elements 60 are arranged within the oven and are operable to radiate heat downwardly on the caps positioned on the tops of the bottles to properly condition the caps during advancement of the bottles by the turret. The heating members 60 are electrically operated, and the terminals extend through the outer wall of the oven as at 61, Figure 3. The oven is supported by brackets 62 depending from a cylindrical closure 63 carried by the top section 44.

The heated caps are contracted about the tops of the bottles by a plurality of contracting heads 65 arranged in an annular series positioned above the turret 24, with a head positioned in alinement with each bottle supported by the turret. The contracting heads 65 are carried by a supporting member 66 which, in turn, is rotatably mounted upon and supported by, the post 50. The supporting member 66 is provided with a depending cylindrical flange 67 which telescopes over a cylindrical hub 68 extending upwardly from the turret 24. The hub 68 is provided with a vertically extending keyway 70 to slidably receive a key 71 secured within the flange 67, whereby the supporting member 66 and the heads 65 carried thereby are rotated in unison with the turret.

Figure 1:
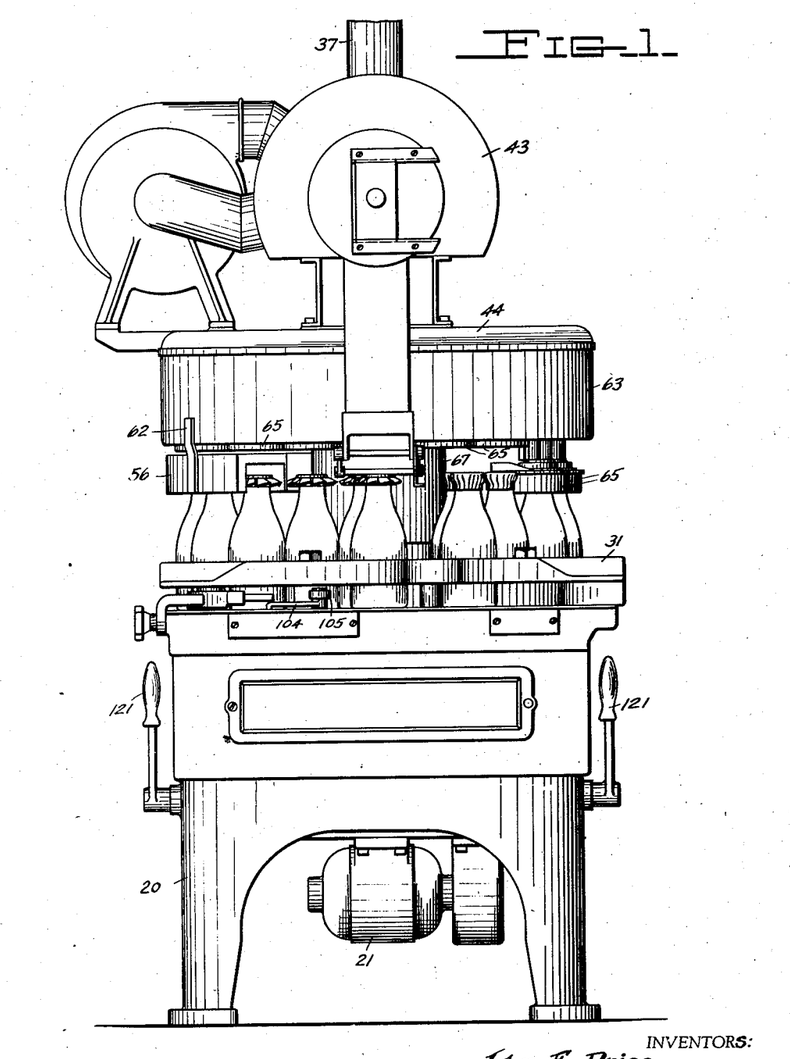
Figure 1 is a front elevational view of a machine embodying our invention.
Figure 2:
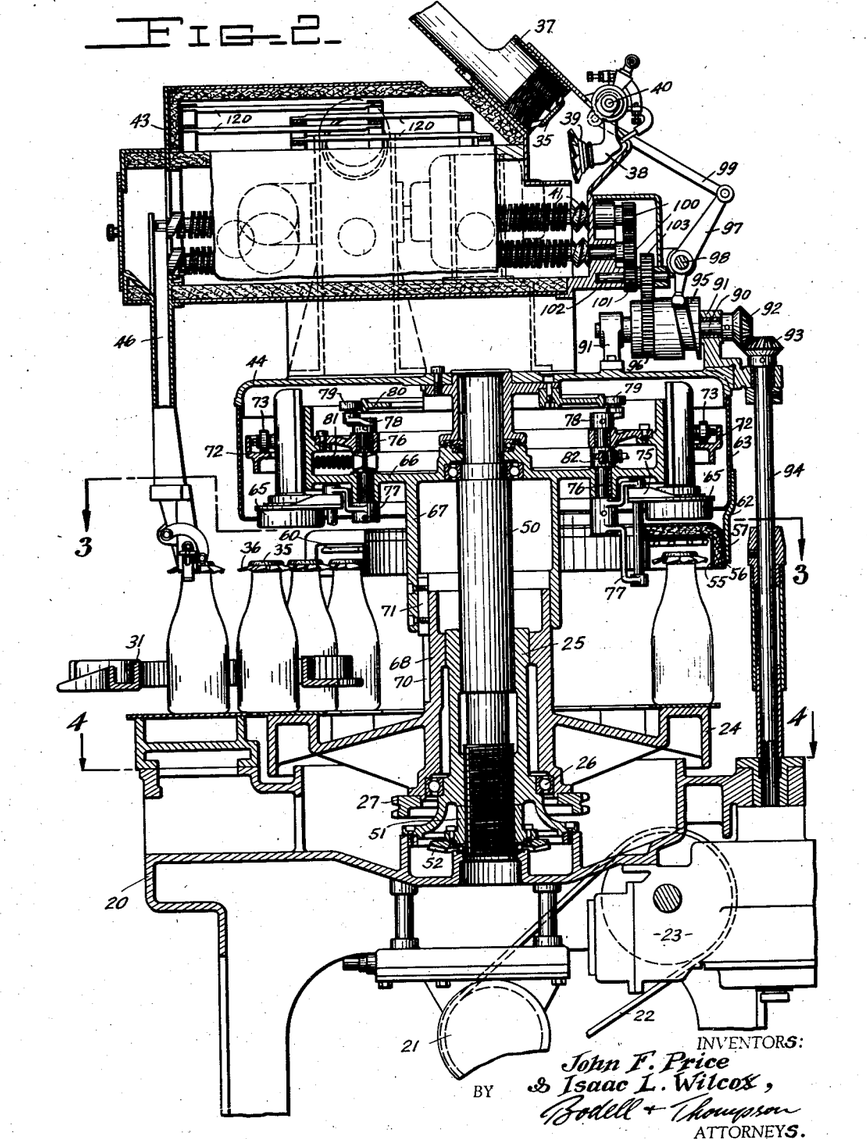
Figure 2 is a vertical sectional view of the machine shown in Figure 1, with parts shown in elevation.

The heads 65 are slidably mounted on the periphery of the supporting member 66 and are moved vertically toward and from the bottles by means of a circular track 72, each head being provided with a roller 73 engaging or riding upon the track 72. The track 72 is arranged so that the heads are elevated above the bottles as the capped bottles enter the out-feed star wheel 30 and the heads remain in elevated position throughout a substantial portion of their travel, or until they have reached a point just beyond the rear end of the cap heating oven. Thereupon, the track 72 permits the heads to descend to cap contracting position, and the heads remain in this position until again elevated at a point adjacent the out-feed star wheel 30. The heads 65 are elevated sufficiently to clear the heating oven, as shown in Figure 2.

Each head contains an annular series of cap contracting members which are movable radially upon oscillation of the member 75. Adjacent each of the heads 65 a shaft 76 is vertically journalled in the supporting member 66. The lower end of the shaft is provided with a rock arm 77 engageable with the member 75 in all vertical positions thereof. The upper end of the shaft 76 is provided with a rock arm 78 having a roller 79 engaging a track 80. The shaft 76 is rotated in one direction to move the cap contracting members radially inwardly by a spring 81 acting against an intermediate rock arm 82. The shaft is held against rotation by spring 81 by engagement of the roller 79 with the track 80. The track 80 is arranged to maintain the cap contracting members in expanded condition while the heads are traveling from a point adjacent the out-feed star wheel 30 until the heads descend upon the heated caps. Thereafter, the track permits the shaft 76 to be rotated by spring 81 to contract the cap about the top of the bottle and to hold the cap thus contracted until the capped bottle approaches the out-feed star wheel. Reference may again be had to the Madden patent referred to for a detail description of the construction of the heads 65.

In order that the caps may be successively removed from the magazine 37 and deposited on the tops of the bottles, mechanism is employed for operating the cap transfer 38 and the screw conveyors 41 in proper timed relationship to the rotation of the turret 24. This mechanism consists of a shaft 90 journalled in brackets 91 on the rear of the top section 44. The rear end of the shaft 90 is provided with a beveled gear 92 arranged to mesh with a similar gear 93 secured to the upper end of a shaft 94 extending upwardly from the gear housing 23 and which is rotated intermittently in timed relation to the rotation of the turret 24.

A cylindrical cam 95 is secured to the shaft 90 intermediate the brackets 91 and is provided with a gear 96. An angle lever 97 is pivotally mounted as at 98 on the rear of the housing 43. One arm of the lever 97 is positioned in the groove of cam 95, and the opposite arm is connected to the transfer member 38 as by link 99.

A gear 100 is secured to the rear end of each of the screw conveyors 41 with the gears arranged in mesh with each other and one of the gears being arranged in mesh with a gear 101 rotatably mounted upon the stud 102 and secured to a gear 103 arranged in mesh with the gear 96. The arrangement is such that upon one revolution of the shaft 90, the cap transfer member is moved into engagement with the lowermost cap of the stack formation and then moved to the cap discharge position shown in Figure 2. During this movement, the suction cup 39 is provided with vacuum in the conventional manner. Simultaneously during movement of the cap transfer member 38, the screw conveyors 41 are rotated sufficiently to advance the procession of caps to cause the cap on the forward end of the conveyors to be discharged into the passageway 46.

Figure 3:
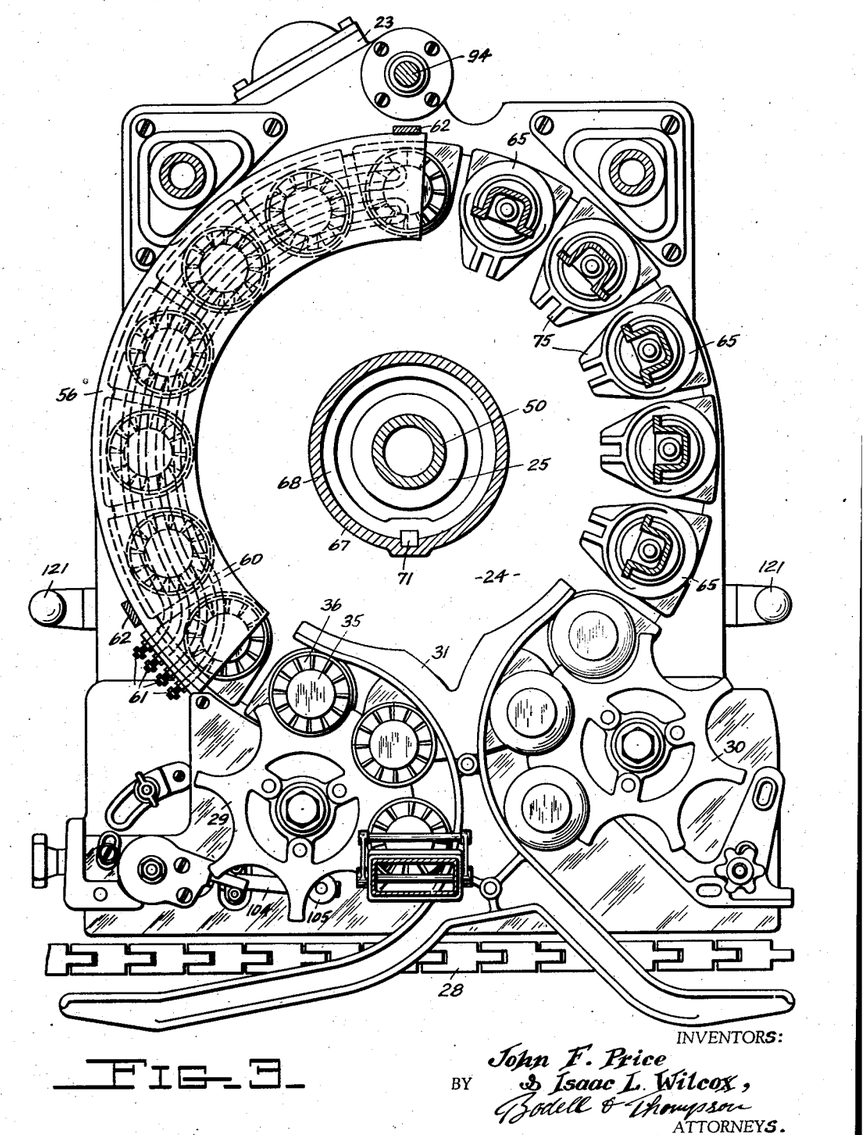
Figure 3 is a transverse sectional view taken substantially on line 3—3, Figure 2.
Figure 4:
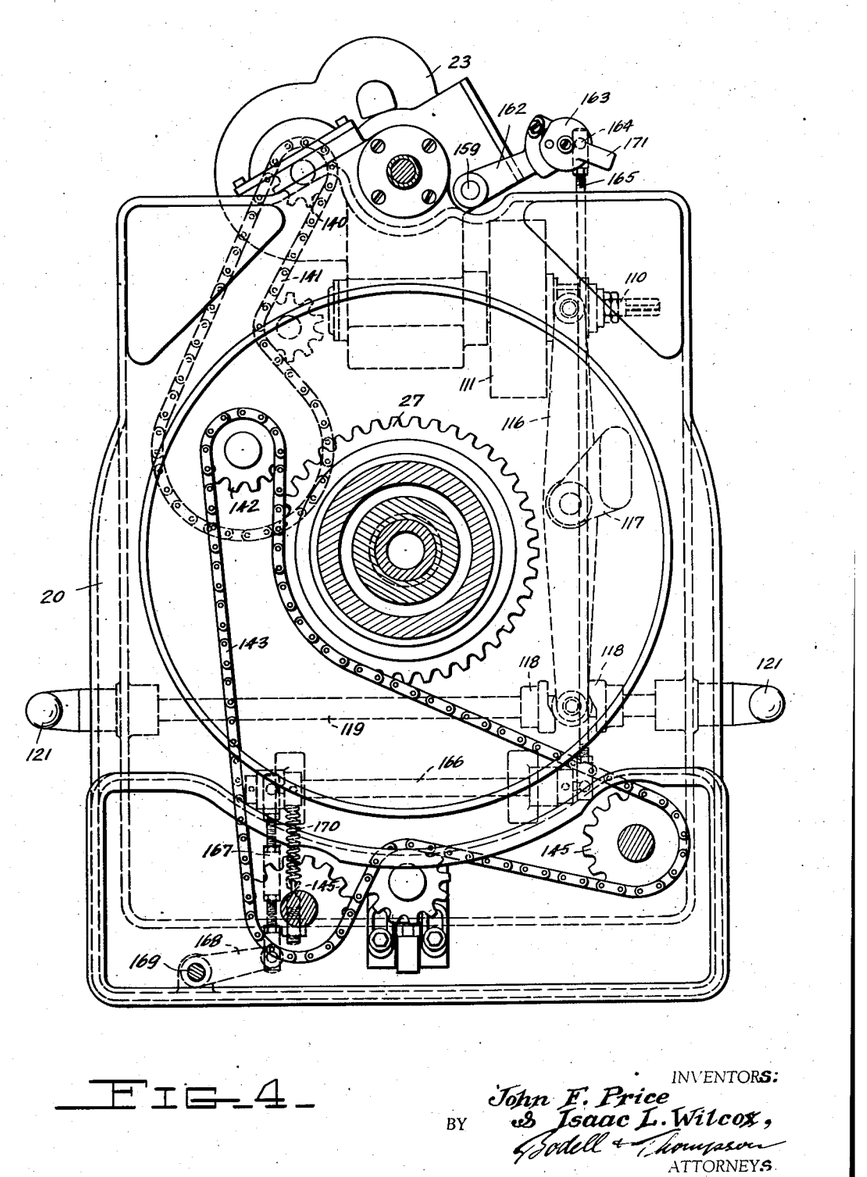
Figure 4 is a view taken on substantially line 4—4, Figure 2.
Figure 5:
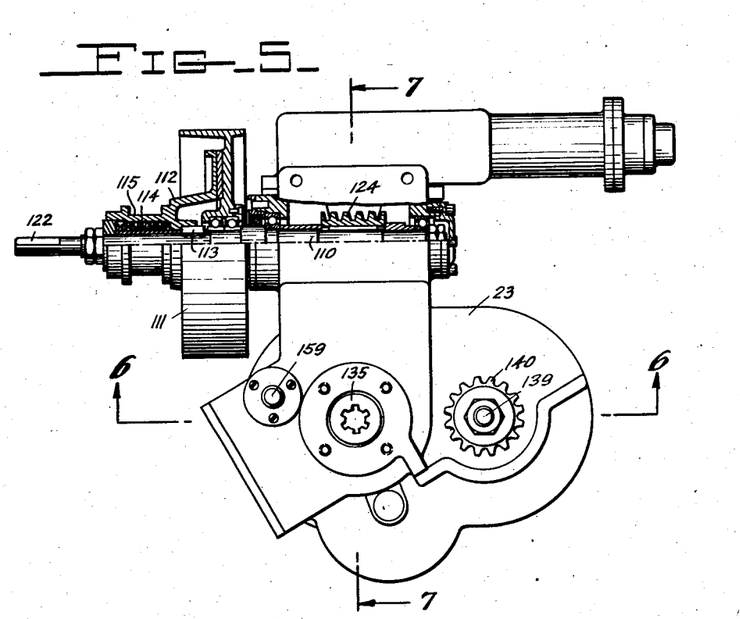
Figure 5 is a top plan view of the transmission with parts shown in section.

The shaft 94 is intermittently operated by a clutch mechanism contained in the gear housing 23 and which is engaged by motion transmitting connections, not shown, actuated by a lever 104 mounted for oscillation on the base 20, the free end of the lever being provided with a roller 105 arranged to be engaged by each bottle as the same is transferred from the conveyor 28, see Figure 3.

The cap transfer mechanism described is disclosed in the Madden patent referred to, and in the Wright Patent No. 2,047,846, July 14, 1936, and per se forms no part of this invention.

It will be obvious to those familiar with machines of this type that the magazine 37 may be positioned on the front side of the machine and the caps deposited in the passageway 46 directly by the cap transfer 38. However, the arrangement described possesses certain advantages.

The length of the cap heating oven depends upon the nature of the substance with which the caps are coated and the speed at which the turret 24 is revolved. Obviously, one coating substance may require the application of much less heat than another substance, in which event the length of oven could, of course, be shortened. We have found that certain coating substances which might be used require a comparatively great amount of heat over a substantial period of time. This continued application of heat at a high degree has a tendency to warm the tops of the bottles which is objectionable in the case of certain products, such as milk which is bottled cold and which is preferably kept at a low temperature until delivered to the consumer. In such instances, the housing 43 may be provided with heating elements 120 and so adjusted, or operated, as to maintain the interior of the housing 43 at a temperature sufficient to preheat the caps advanced by the screw conveyors 41. Such preheated caps will not require prolonged exposure to the heating elements 60 of the cap heating oven in order to bring the caps to proper moldable or sealing condition and accordingly, the length of the cap heating oven may be substantially reduced.

The preheating arrangement is also of great advantage in that it permits the machine to be operated at a much greater speed with any particular cap. This means that the output of the machine may be increased as much as 100 percent without increasing the size of the machine.

On the other hand, if the caps are coated with a substance which does not necessitate the preheating of the caps, the housing 43 and the screw conveyors 41 merely serve as part of the cap transfer mechanism.

Whether the screw conveyors 41 merely act as part of the cap transfer mechanism, or the housing 43 is heated to effect preheating of the caps, the machine operates to more efficiently, and in a more practical manner, apply the closures to the containers.

The transmission housing 23 is arranged in the rear side of the base 20. The transmission consists of a shaft 110 journalled horizontally in the housing and extending outwardly through one side thereof with the driven pulley 111 rotatably mounted upon the extending portion of the shaft. A clutch member 112 is slidably mounted upon the shaft and fixed against rotation by a key 113. The clutch member 112 is pressed into driving engagement with the pulley 111 by helical compression spring 114. The hub portion of the clutch member is formed with a peripheral groove 115 to receive one end of a lever 116 pivoted intermediate its ends on a bracket 117. The opposite end of the lever 116 is engaged by cam members 118 secured to a shaft 119 extending transversely of the base 20 and being provided at each end with an operating handle 121. When the shaft 119 is oscillated, the lever 116 is moved about its pivot effecting engagement and disengagement of the clutch member 112 with the driven pulley 111. The outwardly extending portion of the shaft 110 extends through the base 20 and is provided with a flattened surface 122 to receive a wrench, or other tool, to permit the machine to be rotated by hand for convenience in making adjustment of the various moving mechanism of the machine.

A worm 124 is secured to the shaft 110 and is arranged to mesh with a worm gear 125 mounted upon a shaft 126 journalled in the housing 23 and extending at right angles to the shaft 110. A bell crank 127 is secured to one end of the shaft 126 and is operatively connected to a connecting rod 128 of a vacuum pump 129 which is connected by suitable tubing to the suction cup 39 carried by the cap transfer member 38, see Figure 2.

A beveled gear 130 is secured to the opposite end of the shaft 126 and is arranged to engage a gear 131 secured to a sleeve 132 which is rotatably mounted upon a hollow shaft 133 journalled in vertical position in the housing 23. A second sleeve 135 is rotatably mounted upon the upper end of the shaft 133, the upper end of the sleeve 135 being mounted in a bearing 136 carried by the housing 23.

A pinion 137 is also secured to the sleeve 132 and is arranged to mesh with a spur gear 138 mounted upon a shaft 139 vertically journalled in the housing 23 and being provided at its upper end with a sprocket 140.

When the clutch member 112 is in engagement with the driven pulley 111, the sleeve 132 and sprocket 140 are driven continuously. A chain 141 is trained over the sprocket 140 and over a larger sprocket operatively connected to a sprocket 142. A chain 143 is trained over the sprocket 142, sprocket 27 secured to the hub of the turret 24, and over sprockets 145 associated with the infeed star wheel 29 and the out-feed star wheel 30, whereby the turret 24 and the star wheels 29, 30 are operated in synchronism.

Figure 7:
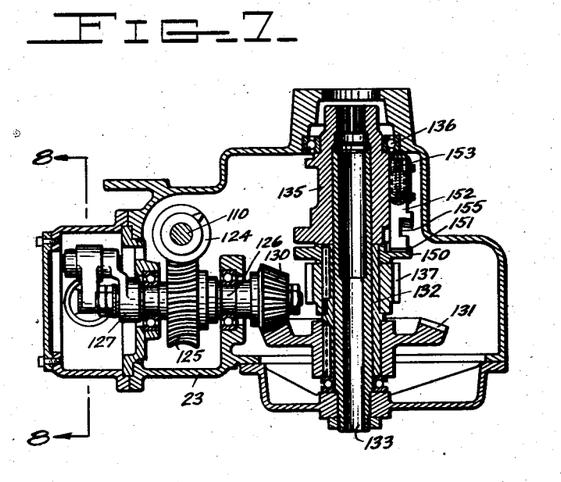
Figure 7 is a view taken on line 7—7, Figure 5.
Figure 8:
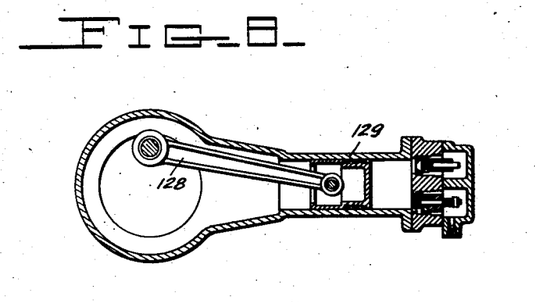
Figure 8 is a sectional view of the air pump taken on a line corresponding to 8—8, Figure 7.

The upper end of the sleeve 135, Figure 7, is formed with a splined bore to receive the lower splined end of the shaft 94, and clutch mechanism is employed to connect the sleeve 135 with the constantly rotating sleeve 132, which clutch mechanism is under the control of the lever 104 previously referred to in connection with Figure 3 of the drawings.

Figure 6:
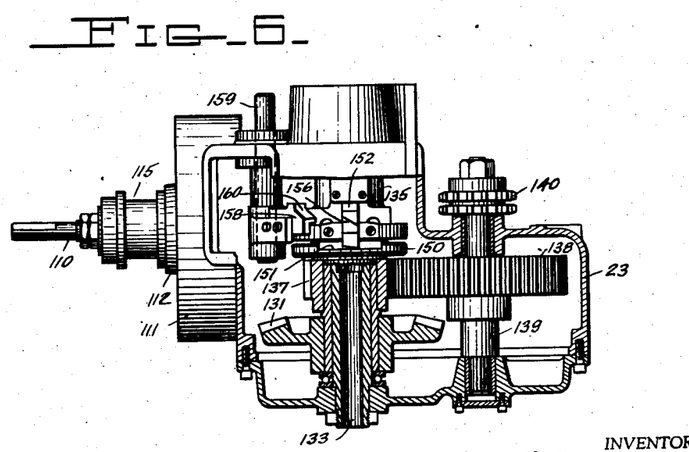
Figure 6 is a view partly in section and partly in elevation taken on line 6—6, Figure 5.

A collar 150 is secured to the upper end of the sleeve 132 and is formed with a notch 151 in the upper face thereof. A pawl 152 is slidably mounted in an axial direction in the sleeve 135 and is urged downwardly or toward the collar 150 by helical compression spring 153. The pawl 152 is provided with a notch 155 intermediate its ends with the upper wall 156 of the notch extending in an angular direction, see Figure 6. The pawl 152 is urged downwardly so that the lower end of the pawl is positioned in the notch 151 and operatively connecting the collar 150 to the sleeve 135 thereby effecting rotation of the sleeve and the shaft 94. The pawl 152 is moved upwardly out of engagement with the collar 150 by a member 158 secured to the lower end of a shaft 159 journalled vertically in the housing 23. The arrangement is such that the free end of the member 158 is moved radially toward and from the axis of the sleeve 135 upon oscillation of the shaft 159. The free end of the member 158 is provided with a beveled surface 160 which coacts with the angular surface 156 of the pawl. When the member 158 is swung inwardly toward the sleeve 135, it engages the pawl 152 causing the lower end of the pawl to be elevated out of the notch 151 and also stopping the pawl and the sleeve 135 in a predetermined position.

An arm 162 is secured to the upper end of the shaft 159, and a disk 163 is adjustably secured to the outer end of the arm. The disk 163 is provided with a crank pin 164 to receive one end of a link 165, the opposite end being operatively connected to an arm secured to one end of a shaft 166 journalled in the base 20. The opposite end of the shaft 166 is also provided with an arm to which one end of a link 167 is connected, and the opposite end of this link is connected to an arm 168 secured to the shaft 169, to the upper end of which is secured the lever 104. Accordingly, when the lever 104 is moved inwardly toward the axis of the star wheel 29 by the presence of a bottle, the shaft 159 is oscillated through the linkage 165, 166, 167, previously described.

This movement effects disengagement of the member 158 from pawl 152, permitting it to descend into the notch 151 of the rotating collar 150. In this manner, the shaft 94 is rotated one revolution whereupon the member 158 again engages the pawl 152. Accordingly, a cap is transferred from the magazine 37 to the conveyor rolls 41 each time a bottle is fed into the star wheel 29. It will be understood that if the bottles are fed continuously into the star wheel, the lever 104 will be periodically actuated and the sleeve 135 rotated through repeated cycles. The linkage connecting lever 104 with member 158 is maintained in normal position by a helical tension spring 170 secured at one end to the base 20 and at the opposite end to an arm secured to shaft 166. The disk 163 and the links 165, 167 are adjustable to effect the proper operation of the clutch mechanism, and the disk 163 is formed with a radially extending portion 171 which serves as a manual or handle by which the clutch operating mechanism may be operated manually if such is desired in effecting initial adjustment of the machine.

In machines of the type disclosed in the Madden and Wright patents, caps coated with certain substances could not be used. For example, if it were necessary to maintain the ovens of those machines at a temperature greater than the ignition point of the caps in order to sufficiently heat the caps while they were progressed through the oven, and the machine should be stopped for any appreciable length of time, the entire supply of caps in the oven would be burned up and it would then be necessary to run the machine idle with the clutch to the cap transfer mechanism engaged manually until the supply of caps in the oven was replenished.

With the machine embodying our invention, the caps may be entirely heated by the cap heating oven after the caps have been deposited on the tops of the bottles, or if the preheating arrangement is used, the preheating temperature may be maintained well below the ignition point of the caps, whereby the caps would not ignite regardless of how long the machine was shut down. If it should be necessary to stop the machine in case of an emergency, the few bottles on the turret 24, positioned under the cap heating oven, could be readily removed by the operator. However, if not removed, only those caps within the heating oven might be damaged.

It will be apparent that the machine embodying our invention is operable to more efficiently and much more rapidly apply caps than machines of this type heretofore in use.

What we claim is:

1. A machine for applying closures to containers, which closures are coated with a substance rendered adhesive by the application of heat to make the closures self securing on the containers comprising a frame, means operable to advance a procession of containers, means for supporting a supply of closures in stack formation, closure transfer means operable to successively transfer said closures from said supply to the tops of said containers, a closure heating member extending over the tops of the containers and operable to heat the closures on the containers during the advancement thereof, and closure contracting means operable to contract the heated closures about the tops of the containers.

2. A machine for applying closures to containers, which closures are coated with a substance rendered adhesive by the application of heat to make the closures self securing on the containers comprising a frame, means operable to advance a procession of containers, means for supporting a supply of closures, closure transfer mechanism operable to successively transfer closures from said supply and deposit the same on the top of said containers during the advancement thereof, a closure heating member extending over the tops of the containers and operable to heat the closures on the containers during the advancement thereof, and a plurality of closure contracting members advanced in unison with the procession of containers and being operable to contract the heated closures about the tops of the containers during the advancement thereof.

3. A machine for applying closures to containers, which closures are coated with a substance rendered adhesive by the application of heat to make the closures self securing on the containers comprising a frame, means operable to advance a procession of containers along an elongated path, a closure magazine for containing a supply of closures, a closure transfer mechanism operable to successively transfer closures from said magazine and deposit the same on the tops of the containers during the advancement thereof, a closure heating member extending over the tops of the containers and operable to heat the closures deposited on the containers during the advancement of said containers along a portion of said path, and closure contracting means operable to contract the heated closures about the tops of the containers during the advancement of the containers along a succeeding portion of said path.

4. A machine for applying closures to containers, which closures are coated with a substance rendered adhesive by the application of heat to make the closures self securing on the containers comprising a frame, means for supporting a plurality of containers, a closure magazine containing a plurality of closures, a closure transfer mechanism operable to transfer a closure from said magazine and deposit the same on each of said containers, a closure heating member extending over the tops of said containers in heat exchanging relation to said closures and being operable to heat said closures, and a plurality of closure contracting members operable to contract said heated closures about the tops of the containers.

5. A machine for applying closures to containers, which closures are coated with a substance rendered adhesive by the application of heat to make the closures self securing on the containers comprising a frame, means for supporting a plurality of containers, means for supporting a supply of closures, means operable to transfer closures from said supply and deposit the same on the tops of said containers, closure heating means extending over the tops of said containers and operable to heat the closures after the same have been deposited on the containers, means operable to move said containers with the closures thereon out of heat exchanging relation with said heating means, and a plurality of closure contracting members operable to contract the closures about the tops of the containers.

6. A machine for applying closures to containers, which closures are coated with a substance rendered adhesive by the application of heat to make the closures self securing on the containers comprising a frame, means for supporting a plurality of containers, means operable for maintaining and preheating a supply of closures, closure transfer mechanism operable to transfer preheated closures from said supply and deposit the same on the tops of said containers, closure heating means operable to heat the closures after the same have been deposited on said containers to closure securing temperature, and a plurality of closure contracting members operable to contract the heated closures about the tops of the containers.

7. A machine for applying closures to containers, which closures are coated with a substance rendered adhesive by the application of heat to make the closures self securing on the containers comprising a frame, a turret journalled on the frame and operable to advance a procession of containers, a magazine containing a supply of closures, closure transfer mechanism operable to transfer a closure from said magazine and deposit the same on the top of each of said containers during the advancement thereof, a closure heating member of arcuate formation arranged above the tops of the containers and being operable to heat the closures deposited thereon, a plurality of closure contracting members arranged above said turret and operable to contract the heated closures about the tops of the containers.

8. A machine for applying closures to containers, which closures are coated with a substance rendered adhesive by the application of heat to make the closures self securing on the containers comprising a frame, means operable to support a plurality of containers, a closure preheating oven, means operable to maintain a supply of closures in said preheating oven and to deposit a closure on the top of each container on said support, a closure heating oven arranged in juxtaposition to said containers on said support and operable to heat the closures deposited on said containers to proper moldable and self securing condition, and a plurality of closure contracting members operable to contract the heated closures about the tops of the containers.

9. In the method of applying a closure to the top of a container, which closure is formed of flexible sheet material with the skirt portion of the closure having a substance applied thereto which is rendered self securing by the application of heat, those steps which include preheating the closure at a temperature below the ignition point of the closure material, depositing the closure on the top of the container, thereafter heating the closure sufficiently to render said substance in self securing condition, and subsequently contracting said closure while in said condition about the top of the container.

10. In the method of applying a closure to the top of a container, which closure is formed of flexible sheet material with the skirt portion of the closure having a substance applied thereto which is rendered self securing by the application of heat, those steps which include maintaining a supply of said closures in preheated condition at a temperature below the ignition point of the closure material, depositing preheated closures on the tops of the containers, thereafter heating the closures deposited on the containers sufficiently to render said substance in self securing condition, and subsequently contracting said heated closures while in such condition about the tops of the containers.

11. A machine for applying closures to containers, which closures are coated with a substance rendered adhesive by the application of heat to make the closures self-securing on the containers comprising a frame, means for supporting a plurality of containers and advancing the same in a procession, means for supporting a supply of closures for quick successive delivery to containers, heating means operable to maintain said supply of closures in a preheated condition, closure transfer mechanism operable to transfer preheated closures from said supply and deposit the same on the tops of the containers while advancing in said procession, a second heater means operable to heat the closures on a plurality of containers to closure securing temperature during the advancement of the containers, and a succession of closure contracting members movable in unison with the containers and operable to successively contract the heated closures about the tops of the containers during the advancement thereof.

12. A machine for applying closures to containers, which closures are coated with a substance rendered adhesive by the application of heat to make the closures self securing on the containers comprising a frame, means for supporting a plurality of containers, means for supporting a supply of closures, means operable to transfer closures from said supply and deposit the same on the tops of said containers, a closure heating member extending over the tops of a plurality of said containers and operable to heat the closures after the same have been deposited on the containers, means operable to effect relative movement between the containers with the closures thereon and said heating means, and a plurality of closure contracting members operable subsequent to said relative movement to contract the closures about the tops of the containers.

JOHN F. PRICE.
ISAAC L. WILCOX.